United States Patent [19]

Kakinoki et al.

[11] Patent Number: 4,961,017

[45] Date of Patent: Oct. 2, 1990

[54] STATOR FOR USE IN A BRUSHLESS MOTOR

[75] Inventors: Wataru Kakinoki; Noriaki Miyoshi; Koji Arai, all of Tokyo, Japan

[73] Assignee: Akai Electric Co., Ltd., Tokyo, Japan

[21] Appl. No.: 248,826

[22] Filed: Sep. 26, 1988

[30] Foreign Application Priority Data

Sep. 28, 1987 [JP] Japan ............................. 62-240794
Oct. 7, 1987 [JP] Japan ............................. 62-251722

[51] Int. Cl.$^5$ .................... H02K 11/00; H02K 1/22
[52] U.S. Cl. ................................. 310/71; 310/68 B; 310/268; 310/DIG. 3; 310/DIG. 6
[58] Field of Search ................ 310/DIG. 3, DIG. 6, 310/40 MM, 49 R, 68 R, 68 B, 71, 268

[56] References Cited

U.S. PATENT DOCUMENTS

| | | | |
|---|---|---|---|
| 4,096,625 | 6/1978 | Morreale | 310/71 |
| 4,224,543 | 9/1980 | Morreale | 310/71 |
| 4,594,524 | 6/1986 | Sudo | 310/68 R |
| 4,636,677 | 1/1987 | Yasuhara | 310/71 |
| 4,658,162 | 4/1987 | Koyama et al. | 310/DIG. 6 |
| 4,668,884 | 5/1987 | Amao et al. | 310/DIG. 3 |
| 4,724,346 | 2/1988 | Klein et al. | 310/67 R |
| 4,757,222 | 7/1988 | Shiraki et al. | 310/68 B |
| 4,894,572 | 1/1990 | Shiraki | 310/68 B |

FOREIGN PATENT DOCUMENTS 52-29904  3/1977  Japan ...................................... 310/71

*Primary Examiner*—Steven L. Stephan
*Assistant Examiner*—Clayton E. LaBalle
*Attorney, Agent, or Firm*—Cushman, Darby & Cushman

[57] ABSTRACT

A stator having a stator yoke, a first and second printed substrates, a plurality of drive coils and hall elements mounted on the first substrate, and a group of drive circuits mounted on the second substrate, wherein an end of the drive coil which is to be connected to the group of the drive circuits is directly connected to the second printed substrate.

15 Claims, 4 Drawing Sheets

STATOR FOR USE IN A BRUSHLESS MOTOR

BACKGROUND OF THE INVENTION

The present invention relates generally to a stator for use in a brushless motor. More particularly, the invention relates to a stator which is compact in size and decreases soldering steps thereby improving a yield rate.

There has been known a conventional stator for use in a brushless motor shown in FIGS. 1A, 1B and 1C. More specifically, FIG. 1A is a front view of a conventional stator, FIG. 1B is a side view and FIG. 1C is a rear view of the stator.

The conventional stator is provided with a stator yoke 1, a first printed substrate 2 which is fixedly mounted on a front surface of the stator yoke 1 in such a manner that the substrate 2 faces a rotor of the motor, and a second printed substrate 3 which is fixedly mounted on a rear surface of the stator yoke 1. As shown in FIG. 1A, both a plurality of drive coils 4 for rotating the rotor of the motor and a plurality of hall elements 5 for detecting a rotational position of the rotor are mounted on the first printed substrate 2 and electrically connected thereto. A group of drive circuits 6 is disposed on the second printed substrate 3 and electrically connected thereto.

In the conventional stator shown in FIGS. 1A, 1B and 1C, six drive coils 4 and three hall elements 5 are utilized thereby constituting a three-phase drive system. The first printed substrate 2 and second printed substrate 3 are electrically connected to and communicated with each other through a plurality of copper wires 7. The copper wires 7 are insulated by a film 8 at an edge portion of the stator. Both ends of each of the drive coils 4 are connected to respective land portions 9 of the first printed substrate 2.

The conventional stator thus constructed necessitates eleven copper wires 7 in total because three wires are required for the drive coils 4 and eight wires are required for the hall elements 8. These eleven wires 7 are gathered in one portion on the stator thereby raising a problem in that a large range is necessary to be provided both on the first and second printed substrates 2 and 3, so that the size of the stator would be disadvantageously increased.

Moreover, many soldering steps are required for assembling the stator, for example, soldering steps for connecting the land portion 9 to a pattern of the first printed substrate 2, for connecting the pattern of the first printed substrate 2 to the copper wires 7, and for connecting the copper wires 7 to a pattern of the second printed substrate 3.

SUMMARY OF THE INVENTION

Accordingly, an object of the present invention is to eliminate the above-described problems accompanying a conventional stator. More specifically, an object of the invention is to provide a stator for use in a brushless motor in which copper wires are decreased in number and, therefore, soldering steps are decreased during the assembly process and, further, a stator can be made compact in size.

Another object of the invention is to provide a stator in which a hall element does not interfere a drive coil thereby improving a yield rate.

The foregoing and other objects have been achieved by the provision of a stator which, according to the invention, has a stator yoke, a first and second printed substrates, a plurality of drive coils and hall elements mounted on the first substrate, and a group of drive circuits mounted on the second substrate, wherein an end of the drive coil which is to be connected to the group of the drive circuits is directly connected to the second printed substrate not through the copper wires. By this arrangement, copper wires connecting the first printed substrate to the second printed substrate are decreased in number thereby achieving a stator which is compact in size.

According to another aspect of the invention, the hall elements are positioned in a group of drive circuits. Such an arrangement is advantageous in that the copper wires can completely be eliminated and, further, the hall element does not interfere the drive coils so that a yield rate can be improved.

DESCRIPTION OF THE PREFERRED EMBODIMENTS

Figure 1A:
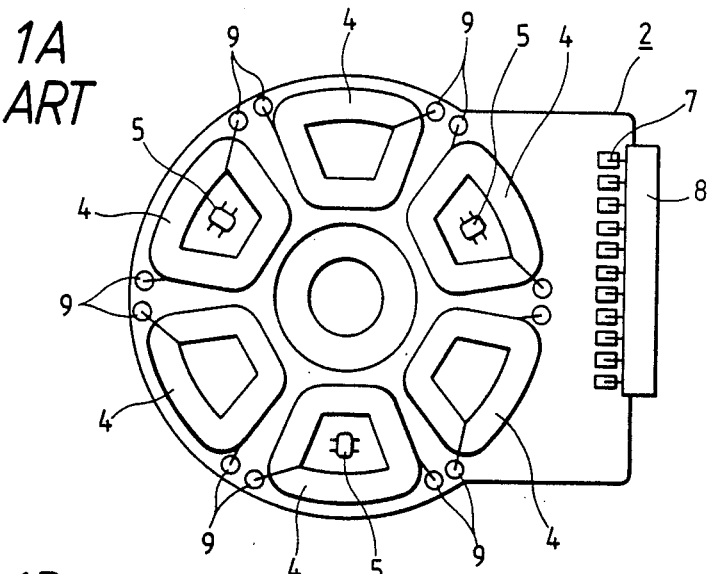
FIG. 1A shows a front surface of a conventional stator.
Figure 1B:
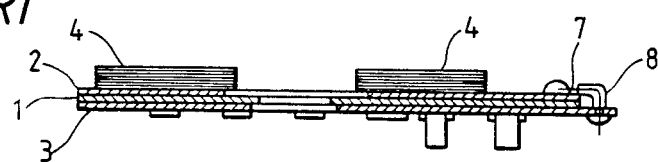
FIG. 1B is a side view of the stator.
Figure 1C:
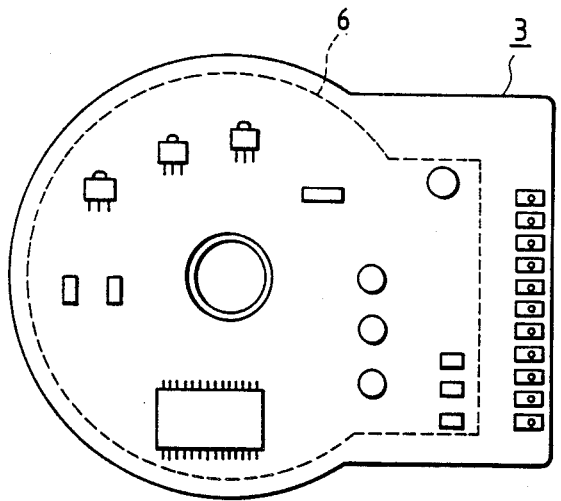
FIG. 1C shows a rear surface of the stator shown in FIG. 1B.
Figure 2A:
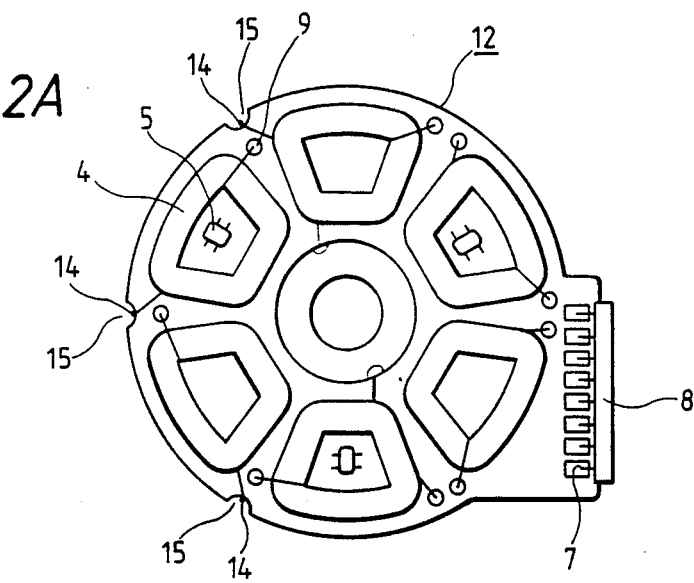
FIG. 2A shows a front surface of a stator according to a first embodiment of the present invention.
Figure 2B:
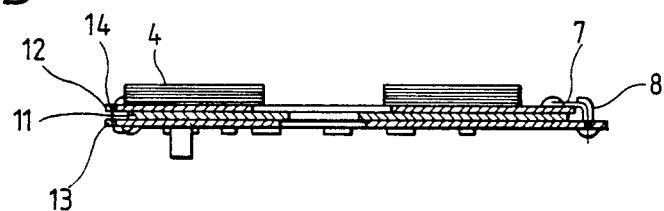
FIG. 2B is a side view of the stator.
Figure 2C:
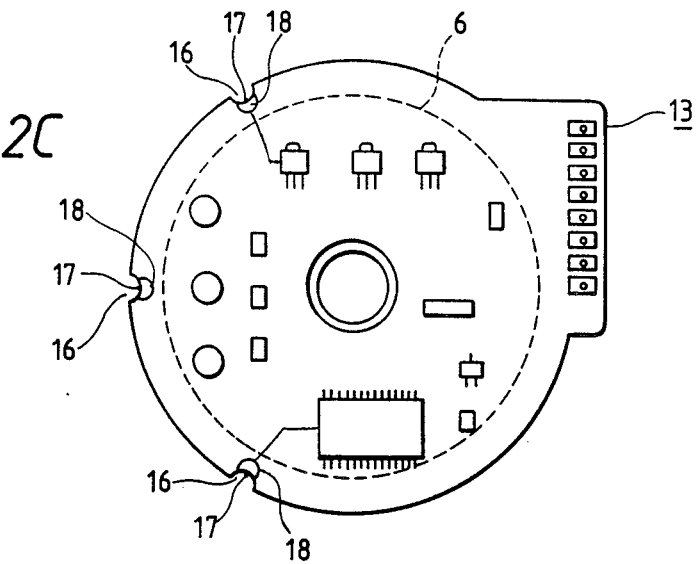
FIG. 2C shows a rear surface of the stator shown in FIG. 2B.
Figure 2D:
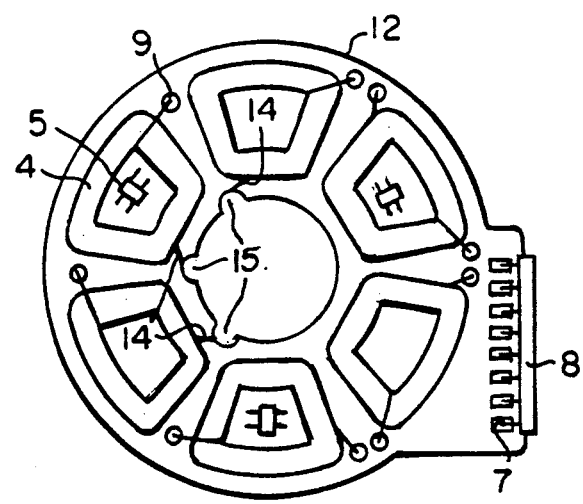
FIG. 2D shows a front surface of a stator with a notch on its inner periphery.

FIGS. 2A, 2B and 2C show a stator of a brushless motor according to a first embodiment of the present invention. More specifically, FIG. 2A shows a front surface of a stator. FIG. 2B is a side view of the stator and FIG. 2C shows a rear surface of the stator.

As illustrated in FIGS. 2A, 2B and 2C, the stator is provided with a stator yoke 11, a first printed substrate 12, and a second printed substrate 13. The first printed substrate 12 is fixedly mounted on a front surface of the stator yoke 11 which surface faces a rotor of the brushless motor (not shown). A plurality of drive coils 4 and a plurality of hall elements 5 are mounted on the first printed substrate 12 and electrically connected thereto. The second printed substrate 13 is fixedly mounted on a rear surface of the stator yoke 11. A group of the drive circuits 6 is disposed on the second printed substrate 13 and electrically connected thereto.

The stator yoke 11 is made smaller in diameter than the first and second printed substrates 12 and 13. Due to this arrangement, a part 14 toward an outer periphery of the drive coils 4 does not contact the stator yoke 11. Therefore, part 14 of the drive coils 4 is not necessary to be subjected to an extra insulating treatment because it does not contact stator yoke 11. However, in case that either the stator yoke 11 or the part 14 of the drive coils 4 is subjected with the insulating treatment, the stator yoke 11 does not necessarily have to be made smaller.

Notches 15 and 16 are formed on an outer periphery both of the first printed substrate 12 and the second printed substrate 13 so that the part 14 of the drive coils 4 does not protrude from the outer periphery of the first and second printed substrates 12 and 13. Such an arrangement decreases a possibility that the part 14 of the drive coils 4 may be broken during the assembly process of the stator. Further, since a position of the part 14 of the drive coil 4 can be fixed with respect to both the first and second substrates 12 and 13, the stator can be assembled with high efficiency.

Figure 3A:
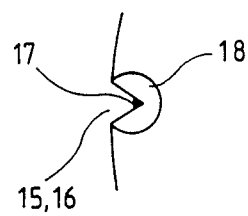
FIGS. 3A and 3B are other arrangements of notches according to the invention.
Figure 3B:
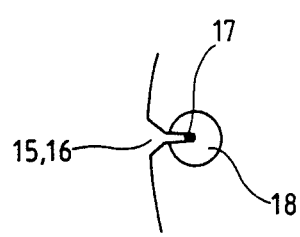

In FIGS. 2A and 2C, the notches 15 and 16 are semicircular in shape. However, the notches may be V-shaped or Y-shaped as shown in FIGS. 3A and 3B, respectively. These arrangements of the notches 15 and 16 are advantageous in that the efficiency of the assembly of the stator is further improved because the fixed position of the part 14 of the drive coil 4 is defined more accurately. Further, the notches 15 and 16 may be formed at an inner peripheral portion of the first and second printed substrates 12 and 13, respectively.

A land portion 18 is formed on the second printed substrate 13 mounting the drive circuits at a surrounding of the notch 16, which land portion is connected to an end 17 of the drive coil 4 so that the end 17 is directly connected to the drive circuits mounted on the second substrate 13. Such a structure advantageously decreases the connection in number between the land portion 18 and the end 17 of the drive coil 4 to be connected to the drive circuits. Further, soldering steps during the assembly for soldering the end 17 of the drive coil 4 relative to the conventional structure can be decreased.

Furthermore, merely eight copper wires 7 for the hall elements are required for connecting between the first printed substrate 12 and the second printed substrate 13 owing to the direct connection of the end 17 of the drive coil 4 to the drive circuits. Therefore, the first and second printed substrates 12 and 13 can be made small in size due to the decrease of the range for disposing the copper wires 7.

Figure 4:
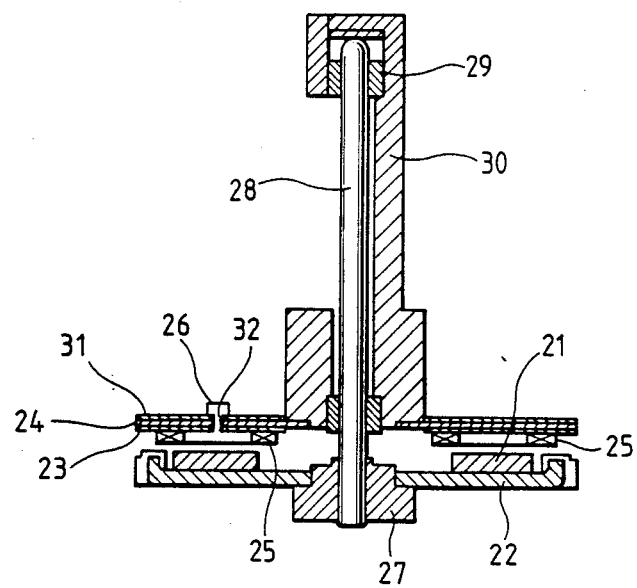
FIG. 4 is a sectional view showing a brushless motor employing a stator according to a second embodiment of the present invention.
Figure 5:
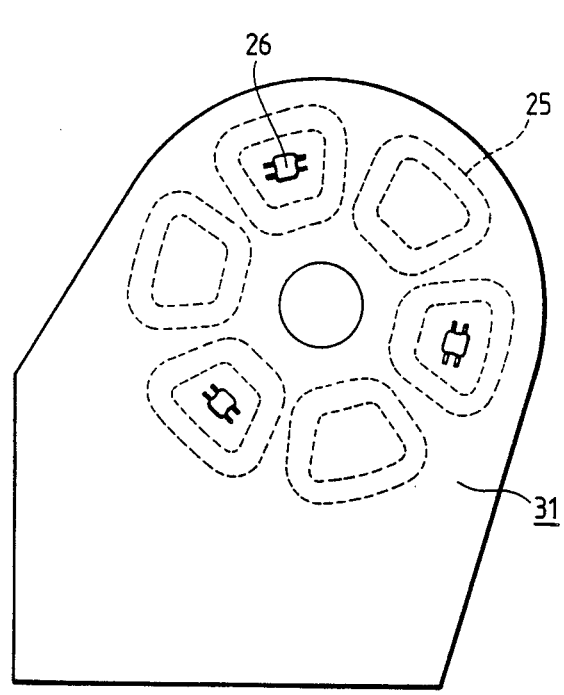
FIG. 5 shows a rear surface of the stator shown in FIG. 4.

FIGS. 4 and 5 show a stator assembled in a brushless motor according to a second embodiment of the present invention. More specifically, FIG. 4 is a cross sectional view showing a stator which is actually assembled in a brushless motor and FIG. 5 shows a rear surface of the stator.

The brushless motor is provided with a drive magnet 21 which is polarized alternately by S and N in the circumference direction thereof, a magnet yoke 22 mounting thereon the drive magnet 21, and a pulley 27 coupling thereto the magnet yoke 22. The pulley 27 is firmly fitted to a rotational shaft 28 which is rotatable with respect to a housing 30 through a bearing 29, so that the magnet 21, the magnet yoke 22 and the pulley 27 act as a rotor of the motor.

The motor is further provided with a stator yoke 24, a first printed substrate 23 mounted on a front surface of the stator yoke 24, which front surface faces the rotor, and a second printed substrate 31 mounted on a rear surface of the stator yoke 24. The stator yoke 24, the first printed substrate 23 and the second printed substrate 31 are fixedly mounted on the housing 30 so that they act as a stator of the motor. As shown in FIGS. 4 and 5, a plurality of drive coils 25 are mounted on the first printed substrate 23 and electrically connected thereto, and a plurality of hall elements 26 for detecting a rotational position of the rotor of the motor are mounted on the second printed substrate 31. The stator yoke 24 is provided with through holes 32 on a position corresponding to the respective hall elements 26 mounted on the second printed substrate. The magnetic flux of the magnet 21 is applied to the hall elements 26 through the respective through holes 32.

FIG. 5 shows a rear surface of the stator viewing from an upper side of the rotational shaft 28. Although it is not illustrated in FIG. 5, the through hole 32 is positioned under each of the hall elements 26.

In the stator of the brushless motor thus structured according to the second embodiment of the present invention, no copper wire for the hall elements is required since the hall elements are directly mounted on the second printed substrate 31. Further, the hall elements 26 and the respective drive coils 25 do not interfere each other since they are mounted on the separate printed substrates.

Moreover, a group of drive circuits for driving the motor can be mounted on the second printed substrate 31. This provision eliminates whole copper wires for connecting the two printed substrates, so that the motor can be advantageously made compact in size.

In the second embodiment of the invention described above, the hall elements are mounted on the second printed substrate 31. However, the hall elements may be buried into the second printed substrate. In such an arrangement, the magnetic flux to the hall elements can be increased thereby improving a detecting sensitivity of the rotational position of the rotor.

As described above, according to the present invention, an end of the drive coil to be connected to the drive circuits side is directly connected to a printed substrate mounting thereon drive circuits. Therefore, copper wires connecting a first printed substrate mounting drive coils to a second printed substrate mounting thereon the drive circuits can be effectively decreased. By such a structure, both of the printed substrates can be made compact and, further, soldering steps are advantageously decreased.

In another aspect of the present invention, hall elements are mounted directly on the second printed substrate. Under such a structure, a range of a land portion can be increased, a difficulty that an end terminal and a terminal of the hall elements may be short-circuited can be eliminated, and a shape and a winding number of the drive coil can be freely arranged Accordingly, a yield rate is improved and, further, the motor can be made compact in size.

What is claimed is:

1. A stator for use in a brushless motor having a rotor, comprising:
    a stator yoke having a first surface, and a second surface opposite said first surface;
    a first printed substrate fixedly mounted on said first surface of said stator yoke;
    a second printed substrate fixedly mounted on said second surface of said stator yoke, said second printed substrate being provided separately from said first printed substrate;
    means for controlling driving of said brushless motor, said motor driving control means being mounted on said second printed substrate and electrically connected thereto; and
    a plurality of drive coils mounted on said first printed substrate and electrically connected thereto, an end of each of said drive coils to be connected to said motor driving control means being directly connected to said motor driving control means and being connected directly to said second printed substrate, wherein said stator is formed with at least one notch through which a part of said drive coils passes and through which said end of said coils is directly connected to said motor driving control means, and wherein said yoke is smaller in diameter than said first printed substrate so that said part of said drive coils does not contact with said stator yoke.

2. The stator of claim 1, wherein said notch is formed on an outer periphery of said first printed substrate.

3. The stator of claim 1, wherein said notch is formed on an inner periphery of said first printed substrate.

4. The stator of claim 1, wherein said notch is semicircular shaped.

5. The stator of claim 1, wherein said notch is V-shaped.

6. The stator of claim 1, wherein said notch is Y-shaped.

7. The stator of claim 1, further comprising detecting means for detecting a rotational position of the rotor, positioned on a different surface than said first surface on which said drive coils are mounted.

8. The stator of claim 7, wherein said detecting means is buried into said second printed substrate.

9. The stator of claim 7, wherein said detecting means is also mounted on said second printed substrate.

10. The stator of claim 7, wherein said detecting means comprises a plurality of hall elements.

11. The stator of claim 10, wherein six of said drive coils and three of said hall elements are provided thereby constituting three-phase drive system.

12. A stator for use in a brushless motor having a rotor, comprising:
  a stator yoke having a first surface, and a second surface opposite said first surface;
  a first printed substrate fixedly mounted on said first surface of said stator yoke;
  a second printed substrate fixedly mounted on said second surface of said stator yoke, said second printed substrate being provided separately from said first printed substrate;
  means for controlling driving of said brushless motor, said motor driving control means being mounted on said second printed substrate and electrically connected thereto; and
  a plurality of drive coils mounted on said first printed substrate and electrically connected thereto, an end of each of said drive coils to be connected to said motor driving control means being directly connected to said motor driving control means and being connected directly to said second printed substrate, detecting means for detecting a rotational position of the rotor, positioned on a different surface than said first surface on which said drive coils are mounted,
  a second printed substrate on which said motor driving control means is mounted, said second printed substrate being fixedly mounted on a second surface of said yoke, wherein said detecting means is also mounted on said second printed substrate, wherein said first surface faces the rotor, and said stator yoke is formed with a through hole at a portion corresponding to said detecting means so that said detecting means can detect through the through hole.

13. The stator of claim 12 wherein said portion where said detecting means is located is on said second printed substrate at a location corresponding to a center of said drive coils on said first printed substrate, and said through holes are located in said center of said drive coils.

14. A stator for use in a brushless motor that has a rotor, comprising:
  a stator yoke;
  a first printed substrate mounted on a first surface of said stator yoke, which faces said rotor, and having at least one notch in its outer periphery;
  a plurality of driving coils, each located on said first printed substrate, and energized to interact with said rotor, having at least a portion which passes through said notch;
  a second printed substrate on a second surface of said stator yoke, having a conductive land printed thereon, and electrically connected to said notch, so that said driving coils have a direct electrical connection to said second printed substrate, wherein a diameter of said yoke is smaller than a diameter of either said first or said second substrates, so that said portion of said drive coil does not need to be insulated.

15. A stator for use in a brushless motor that has a rotor, comprising:
  a plurality of driving coils, each mounted on said first printed substrate, and energized to interact with said rotor, and each having a shape leaving a space in a central portion thereof;
  a stator yoke formed with through holes at an area corresponding to said space in said central portion of said driving coils;
  a first printed substrate mounted on a first surface of said stator yoke, which faces said rotor;
  a second printed substrate on a second surface of said stator yoke; and
  means for detecting a position of said rotor, mounted on said second printed substrate above said through holes, so that said rotor position can be sensed through said through holes.

* * * * *